350-3.62 SR

OR 3,706,080

TX 3033H
X 3036T
X 3049W (4)

Dec. 12, 1972 TZUO-CHANG LEE 3,706,080

HOLOGRAPHIC OPTICAL MEMORY HAVING PIVOT LENS APPARATUS

Filed June 1, 1971 6 Sheets-Sheet 1

INVENTOR.
TZUO-CHANG LEE

BY Osmund R. Dahle

ATTORNEY.

3706080
OR IN 340/174YC

INVENTOR.
TZUO-CHANG LEE
BY
Omund R Dahle
ATTORNEY

Dec. 12, 1972 TZUO-CHANG LEE 3,706,080

HOLOGRAPHIC OPTICAL MEMORY HAVING PIVOT LENS APPARATUS

Filed June 1, 1971 6 Sheets-Sheet 3

*INVENTOR.*

TZUO-CHANG LEE

*BY* Omund R. Dahle

*ATTORNEY.*

Dec. 12, 1972 TZUO-CHANG LEE 3,706,080

HOLOGRAPHIC OPTICAL MEMORY HAVING PIVOT LENS APPARATUS

Filed June 1, 1971 6 Sheets-Sheet 4

INVENTOR.
TZUO-CHANG LEE

BY

Omund R. Dahle

ATTORNEY.

INVENTOR.
TZUO-CHANG LEE
BY Omund R. Dahl
ATTORNEY.

HOLOGRAPHIC OPTICAL MEMORY HAVING PIVOT LENS APPARATUS

INVENTOR.
TZUO-CHANG LEE
BY
Omund R. Dahl
ATTORNEY.

3,706,080
Patented Dec. 12, 1972

3,706,080

HOLOGRAPHIC OPTICAL MEMORY HAVING PIVOT LENS APPARATUS

Tzuo-Chang Lee, Bloomington, Minn., assignor to Honeywell Inc., Minneapolis, Minn.
Filed June 1, 1971, Ser. No. 148,505
Int. Cl. G11c *11/14, 11/42*
U.S. Cl. 340—174 YC 16 Claims

ABSTRACT OF THE DISCLOSURE

A holographic optical memory system includes pivoting lens apparatus positioned proximate the memory medium. This arrangement allows the holograms to be read out using the same beam as that which acted as the reference beam during the storage of the holograms. The pivoting lens apparatus pivots the portion of the read out beam which is diffracted by each hologram into a common reconstructed image plane. A photodetector array is positioned at the reconstructed image plane.

BACKGROUND OF THE INVENTION

This invention relates to an optical memory and in particular to a holographic optical memory.

In the specification, the term "light" is used to mean electromagnetic waves within the band of frequencies including infrared, visible and ultraviolet light.

A holographic optical memory makes use of a memory memory medium upon which many individual holograms are stored. Each hologram represents a different bit pattern or "page." The information is stored by directing two beams to a desired location on the memory medium. One beam, the information beam, contains the bit pattern formed by a page composer, while the second beam acts as the reference beam necessary for holographic storage. To read out the information, a readout beam selectively illuminates one of the holograms stored, thereby producing at a reconstructed image plane a reconstructed image of the bit pattern stored in the hologram. An array of photodetectors is located at the reconstructed image plane to detect the individual bits of the bit pattern.

This type of memory is extremely attractive. In the "bit-by-bit" type of optical memory, a single recorded spot on the memory medium represents only one information bit. On the other hand, a single hologram recorded on the same memory medium represents a page which may contain as many as $10^5$ bits. Memories having $10^5$ or $10^6$ pages have been proposed, with each page containing about $10^5$ bits.

Another advantage of the holographic optical memory is that the information stored in the hologram is stored uniformly throughout the hologram rather than in discrete areas. Therefore the hologram is relatively insensitive to blemishes or dust on the memory medium. A small blemish or dust particle on the memory medium cannot obscure a bit of digital data as it can if the bits are stored in a bit-by-bit memory.

One difficulty in holographic optical memories has been the requirement that the reconstructed image produced by each hologram must be produced at a common reconstructed image plane. This is necessary so that a single photodetector array which is positioned at the reconstructed image plane can be used to read different pages, One solution to this difficulty which was proposed by R. J. Collier and L. H. Lin in U.S. Pat. 3,530,442 is to use a readout beam which is the conjugate of the write-in reference beam such that the reconstructed real images fall in a common plane. In other words, if the reference beam is represented by the term $$e^{i(\xi x+\eta y)}$$

where $x$ and $y$ are the coordinates of the memory medium and $\xi$ and $\eta$ are the $x$ and $y$ components of the optical propagation constant $\vec{k}$, and the information beam is represented by the term $e^{ikr}$, where $r$ is the distance between the object point and the hologram plane, the hologram stored can be described by $$|e^{i(\xi x+\eta y)}+ae^{ikr}|^2$$

where it is assumed that the reference beam has unity amplitude and the object has amplitude $a$. If the hologram is then illuminated with a beam which is the conjugate of the write-in reference beam, in other words it is represented by the term.

$$e^{-i(\xi x+\eta y)}$$

the resulting reconstructed image is represented by $e^{-ikr}$, which is real and which possesses a real pivot. The disadvantage of such a system is the requirement of a separate readout beam which adds unesirable complexity to the system.

One proposed solution for voiding the complexity of having to provide a separate readout beam was described by W. C. Stewart and L. S. Cosentino in "Optics for a Read-Write Holographic Memory," Applied Optics, 9, 2271, October 1970. In this system, the reference beam falls on the memory medium perpendicularly. Since a reference beam normally incident on the memory medium is its own conjugate, the complexity of providing separate readout and reference beams can be avoided. This proposal requires that the final field lens in the deflector optics assembly have a diameter at least as large as the memory medium. Any optical component in the path of the reference beam has to be as large in size as the memory medium. Furthermore, since the reference beam is incident normally upon the memory medium, the signal beam is necessarily obliquely incident upon the memory medium making its extremely difficult for the signal beam to have a uniform amplitude at the plane of the memory medium. This is unfavorable for holographic recording on the memory medium because non-uniformity of the amplitude of the signal beam causes the diffraction efficiency to suffer accordingly.

SUMMARY OF THE INVENTION

The holographic optical memory of the present invention utilizes pivoting means which is positioned proximate the memory medium. The pivoting means can be a single lens or multiple lenses or a mirror. During the reading stage, the pivoting means pivots the portion of the readout beam which is diffracted by each hologram into a common reconstructed image plane. The detector array is positioned at the reconstructed image plane, each detector of the array being positioned to receive the light representing one bit of the bit pattern stored in the hologram and to provide an output signal indicative of the intensity of the light received.

In the present invention the hologram stored on the memory medium may be read out using the same beam which ...cted as the reference beam during the storage of the holograms. Since the pivoting means pivots the diffracted portion of the beam from each hologram into a common reconstructed image plane, it is not necessary for the reference beam to fall on the memory medium perpendicularly. Therefore, the various signal beams can be directed at much closer to normal incidence to the memory medium than in the prior art system which requires that the reference beam fall normally upon the memory medium.

DESCRIPTION OF THE PREFERRED EMBODIMENTS

Figures 1A, 1B:
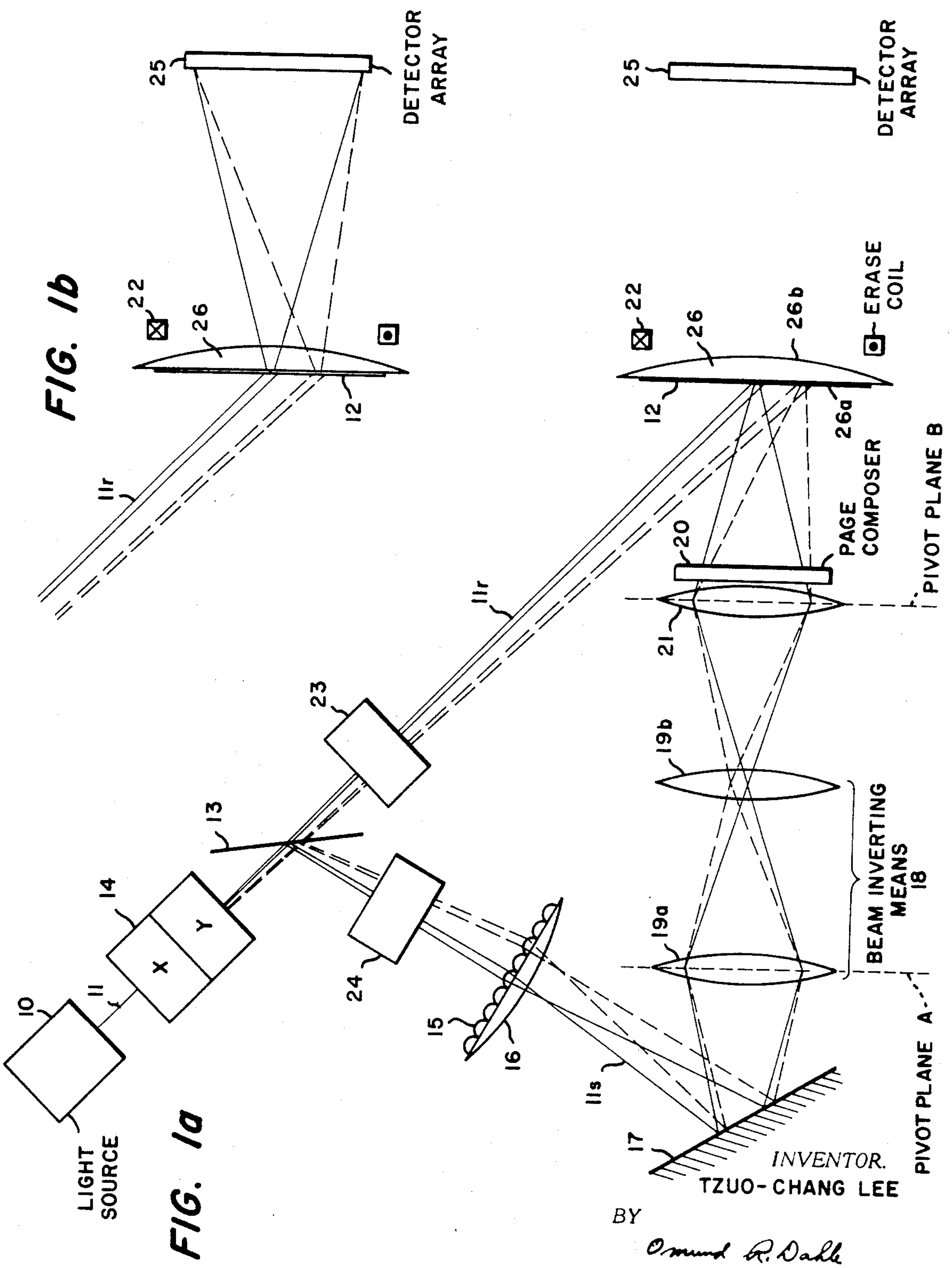
FIGS. 1*a* and 1*b* diagrammatically show one embodiment of the present invention.

Referring to FIG. 1, there is shown a holographic optical memory representing one embodiment of the present invention. Light source means 10 provides a coherent light beam 11. A memory medium 12 is provided for the storage of a plurality of holograms. In the particular embodiment shown in FIG. 1 the memory medium is a magnetic film of manganese bismuth. However, it is to be understood that other materials may be used as memory medium 12. These include photochromic and various photographic materials. Beam splitter means 13 is positioned in the path of light beam 11 to split coherent light beam 11 into a first beam **11*r* and a second beam 11*s*. Beam directing means simultaneously direct first beam 11*r* and second beam 11*s* to coincide at a selected region of memory medium 12 during the writing stage of operation and direct first beam 11*r* to the selected region during the reading stage of operation. In the particular embodiment shown in FIG. 1, beam directing means comprise light beam deflector means 14, an array of individual lenses 15, field lens 16, mirror 17, and beam inverting means 18. Light beam deflector means 14 is positioned between light source means 10 and beam splitter means 13 for deflecting first and second beams 11*r* and 11*s* to a plurality of resolvable spots. Light beam deflector means 14 may for instance comprise acousto-optic, electro-optic or mechanical light beam deflectors. In its preferred form light beam deflector means 14** is capable of deflecting the first and second beams into two dimensions, hereafter referred to as the *x* and the *y* directions. In the various figures, two possible beam positions are shown which are represented by the solid and the dashed lines, respectively.

Mirror 17 may be positioned in either first beam **11*r* or second beam 11*s*. Mirror 17 changes the direction of propagation of one of the beams so that they may converge on a common area of memory medium 12**.

The array of individual lenses 15 is positioned in the path of second beam **11*s***. The array may comprise a hololens or, as shown in FIG. 1, may consist of a panel of fly's eye lenses. Each lens is positioned at one of the plurality of resolvable spots. Preferably the size of each lens is equal to that of one resolvable spot. The function of the individual lenses is to reduce the beam diameter of the resolved spot such that the ratio of the original spot size to the reduced spot size is equal to or greater than the number of resolution elements needed to form one hologram. A Fourier transform hologram should have a minimum linear size of $$3\lambda L/d$$

where $d$ is the bit-to-bit spacing, $\lambda$ is the wavelength of the light and L is the distance between the object and the hologram. The resolution in the hologram is $$\lambda L/D$$

so that the hologram needs a minimum of $9N^2$ resolution spots, where D is the linear dimension of the object and N is the total number of bits in one dimension. If the diameter of an individual lens in the fly's eye lens panel is A and the focal length $f$, then the condition $$\frac{(A^2)_2}{\lambda f} \geq 9N^2$$

must be satisfied. A similar system for increasing the number of resolvable spots by the use of fly's eye lenses is described in U.S. Pat. 3,624,817, by T. C. Lee and J. D. Zook, which is assigned to the same assignee as the present invention.

Field lens 16 pivots the deflected beam at pivot plane A. In the preferred embodiment shown in FIG. 1*a*, field lens 16 is in physical contact with the array of individual lenses 15. However, it is to be understood that field lens 16 may be separate from the array of individual lenses 15.

Beam inverting means 18, which comprises lenses **19*a* and 19*b* positioned in the path of second beam 11*s*, inverts the angular direction $+\phi$ into $-\phi$, where $\phi$ is the angle of the central ray of second beam 11*s* makes with respect to the optical axis of the lens system. Beam inverting means 18 is necessary to ensure that the deflected first and second beams 11*r* and 11*s* always coincide at the memory medium. Beam inverting means 18 alternatively may be positioned in the path of reference beam 11*r*, and may comprise a pair of dove prisms rather than lenses 19*a* and 19*b***. As shown in FIG. 1*a*, beam inverting means 18 is so positioned that second beam **11*s*** is again pivoted at pivot plane B.

Page composer 20 is positioned in the path of second beam **11*s* proximate pivot plane B. Page composer 20 creates a bit pattern in second beam 11*s* during the writing stage of operation. Fourier transform lens means 21 performs a Fourier transform of the bit pattern. Page composer 20 may be positioned such that second beam 11*s* passes through page composer 20 prior to or after second beam 11*s* passes through Fourier transform lens means 21**.

Beam intensity control means, which in the embodiment shown in FIG. 1*a* comprise individual modulators 23 and 24 in the first and second beams, cause the combined intensity of the first and second beams to be sufficient to store the bit pattern as a hologram during the writing stage. During the reading stage the intensity of light incident upon the hologram must be insufficient to alter the hologram. Although two modulators 23 and 24 are specifically shown in the figures, it is to be understood that in some embodiments of the present invention, a single modulator which is positioned between light source 10 and beam splitter 13 may comprise the beam intensity control means.

When memory medium 12 comprises a magnetic film, erase coil 22 positioned proximate memory medium 12 may be utilized to aid erasure of the holograms.

FIG. 1*b* shows the operation of the system of FIG. 1*a* during the reading stage of operation. During readout first beam **11*r* is directed to one of the holograms stored on memory medium 12. A portion of first beam 11*r* is diffracted by the hologram to form a reconstructed image of the bit pattern stored in the hologram. An array of detectors 25** is positioned at a reconstructed image plane. Each detector of the array is positioned to receive the light representing one bit of the bit pattern and to provide an output signal indicative of the intensity of the light received.

Pivoting means in the form of pivoting lens 26, which may comprise a single lens or multiple lenses, is positioned proximate memory medium. Pivoting lens 26 pivots the diffracted portion of first beam 11*r* from each of the plurality of holograms into the reconstructed image plane. In FIG. 1 is shown a preferred embodiment in which pivoting lens 26 has a substantially flat surface 26*a* and a curved surface 26*b*. Memory medium 12 is a deposited layer on the substantially flat surface 26*a* of field lens 26. However, it is to be understood that pivoting lens 26 may be separate from memory medium 12.

To understand the operation of pivoting lens 26, it is necessary to analyze the different images produced during readout. Referring to FIG. 2 there is shown the different images produced from different holograms during readout where no pivoting lens is used. For illustrative purposes each hologram stored on memory medium 12 is represented by a block 30. In the following analysis several assumptions are made. First, it is assumed that the signal is a point source located at S, and the hologram plane is a distance L away. Second, it is assumed that the reference beam is a plane wave which is deflected to different locations on memory medium 12 to form the different holograms. Third it is assumed that the deflected reference beam is pivoted at plane P. One of the holograms produced at memory medium 12 can be described by $$|e^{i(\xi x+\eta y)}+ae^{ikr}|^2 \qquad \text{Equation 1}$$

The two complex terms of the above equation are $$e^{i(\xi x+\eta y-kr)} \qquad \text{Equation 2}$$

and $$e^{-i(\xi x+\eta y-kr)} \qquad \text{Equation 3}$$

Upon reconstruction by illuminating the hologram with the same reference beam, which is represented by the term $$e^{i(\xi x+\eta y)}$$

the image term formed by Equation 3 becomes $$e^{i(\xi x+\eta y)}(e^{-i(\xi x+\eta y-kr)})=e^{ikr} \qquad \text{Equation 4}$$

Figure 2A:
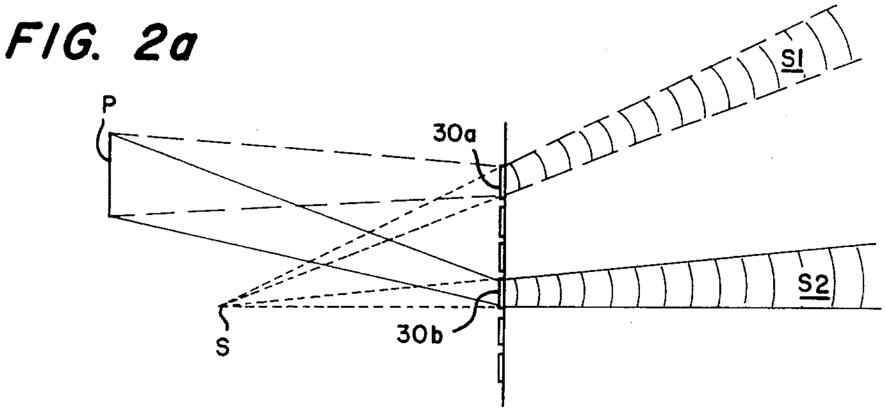
FIGS. 2*a* and 2*b* show the real and virtual images produced by the reference beam during read out in the system of FIG. 1 when no pivoting lens is utilized.

This term is recognized as the wavefront emerging from S. Therefore it is a virtual image. FIG. 2*a* shows virtual images S1 and S2 from different holograms on memory medium 12. The virtual images possess a virtual pivot at point S.

The other term, represented by Equation 2, gives $$e^{i(\xi x+\eta y)}(e^{i(\xi x+\eta y-kr)})=e^{i(2\xi x+2\eta y-kr)} \qquad \text{Equation 5}$$

Figure 2B:
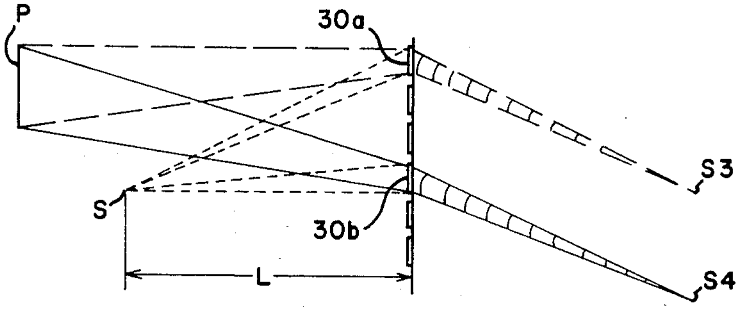

This term produces real images such as S3 and S4 of FIG. 2*b*. These images are spatially separated and have neither a real nor a virtual pivot. Therefore they cannot be brought into a common detecting location. As a result, these conjugate or twin images cannot be employed in a holographic mass memory which utilizes the reference beam as the readout beam.

Figure 3:
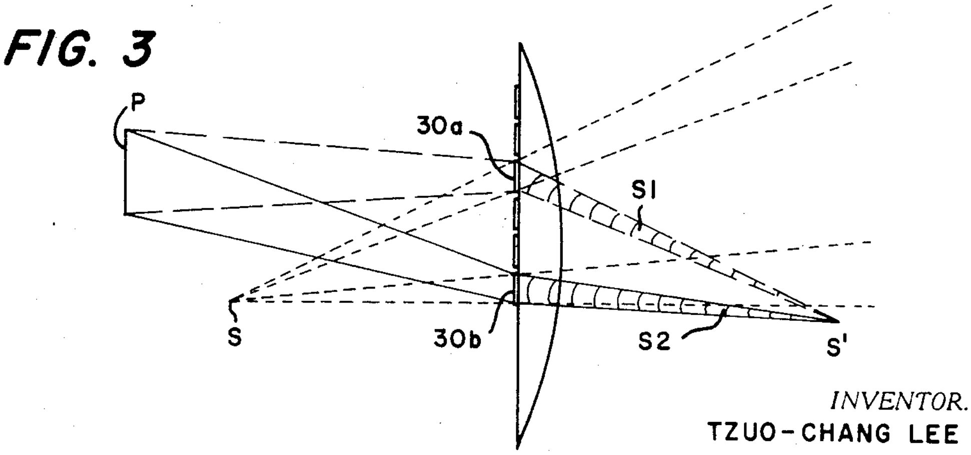
FIG. 3 shows the transformation of the virtual pivot of FIG. 2*b* into a real pivot by the use of a pivoting lens.

FIG. 3 shows a system in which pivoting lens 26 is used. Virtual pivot S of FIG. 2*a* is transformed by pivoting lens 24 into a real pivot S′.

Figure 4A:
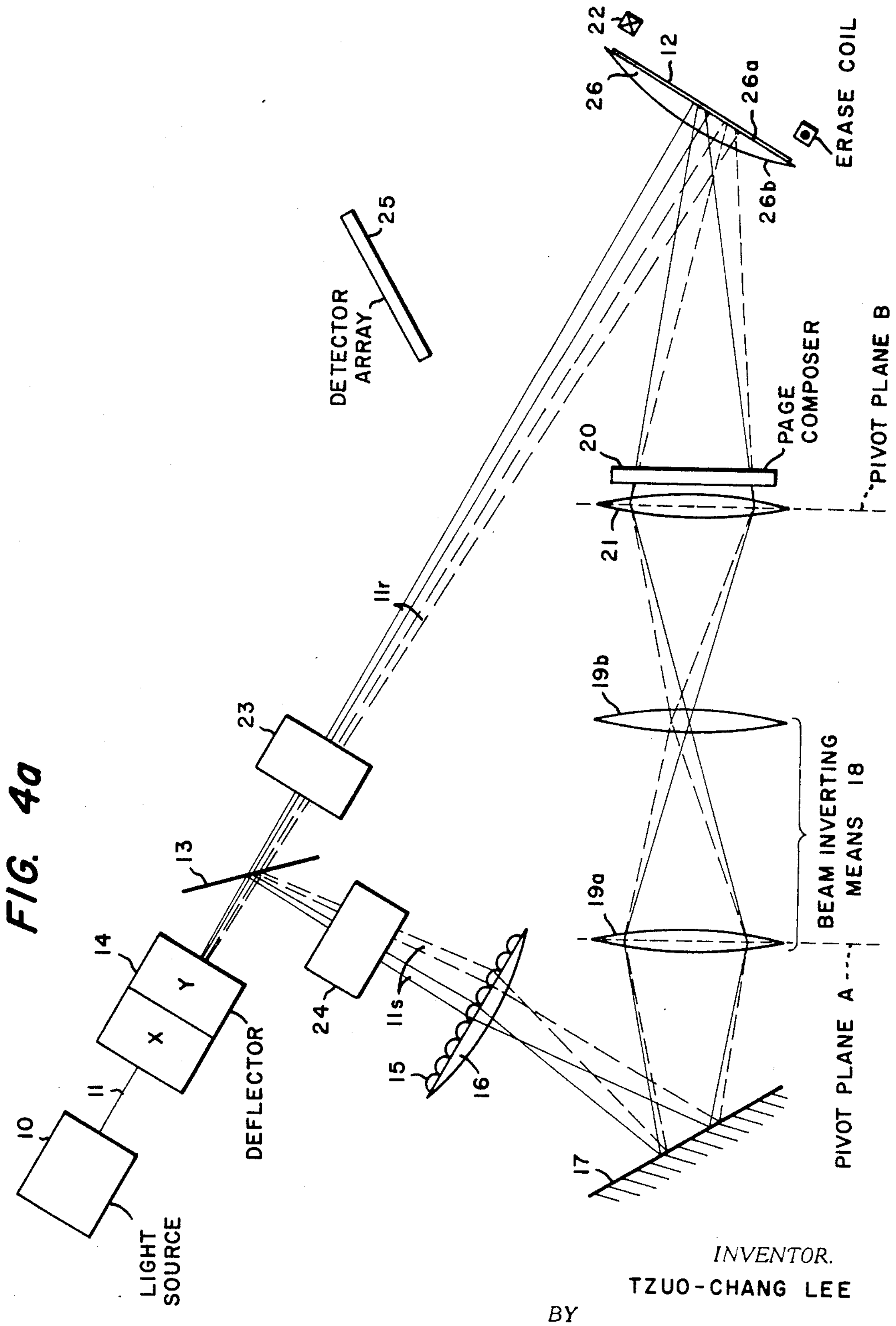
FIGS. 4*a* and 4*b* diagrammatically show another embodiment of the present invention in which a magnetic film is the memory medium and the Kerr effect readout from the magnetic film is utilized.
Figure 4B:
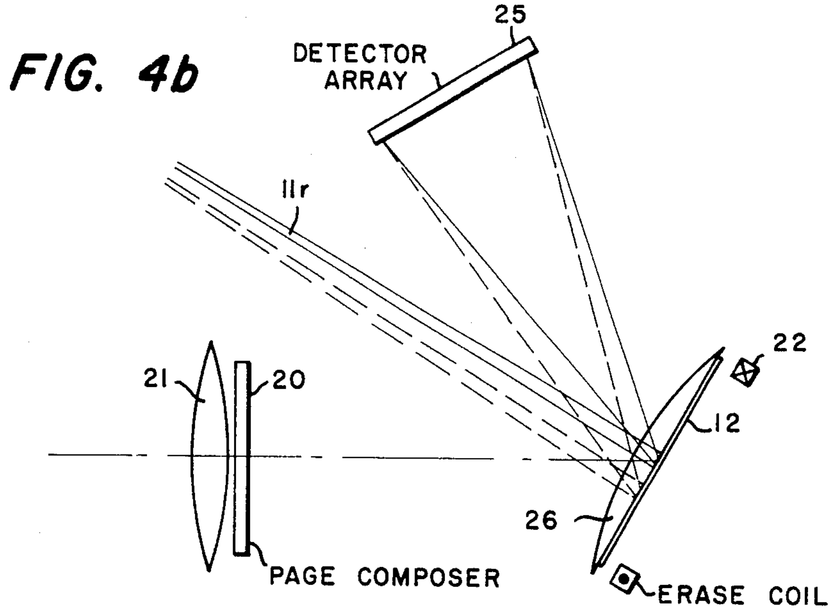

FIGS. 4*a* and 4*b* show another embodiment of the present invention in which a magnetic film is memory medium 12 and in which the Kerr effect readout from the magnetic film utilized. In the Kerr effect the diffracted portion of the first beam is reflected by the magnetic film whereas in a Faraday effect readout such as shown in FIG. 1*b* the diffracted portion of the first beam is transmitted through a magnetic film. The system of FIG. 4 is similar to that shown in FIG. 1 and similar numerals are used to designate similar elements.

FIG. 4 shows a preferred embodiment in which memory medium 12, which may be for example manganese bismuth film, is a deposited layer on a substantially flat surface 26*a* of pivoting lens 26. It should also be noted that pivoting lens 26 is positioned between memory medium 12 and detector array 25 and that first and second beams 11*r* and 11*s* must pass through pivoting lens 26 to reach memory medium 12. It should again be understood that memory medium 12 may be separate from pivoting lens 26.

Figure 5A:
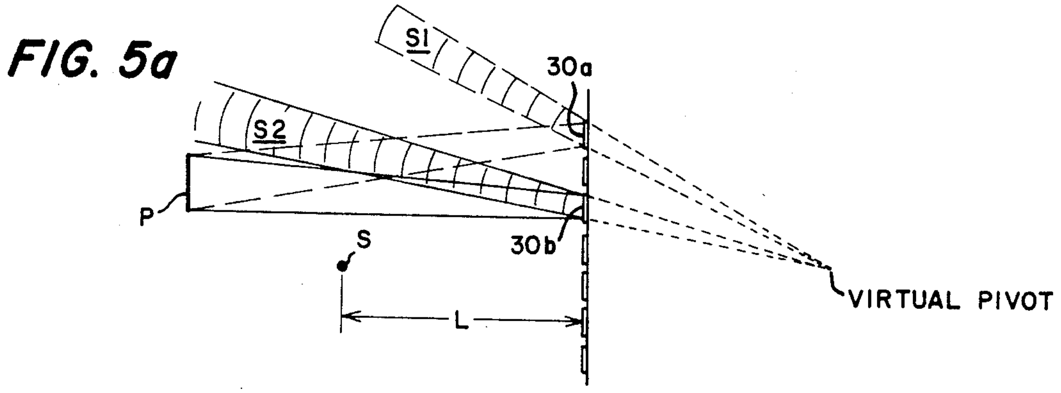
FIGS. 5*a* and 5*b* show the virtual images produced by the reference beam during readout in the system of FIGS. 4*a* and 4*b* with and without a pivoting lens.
Figure 5B:
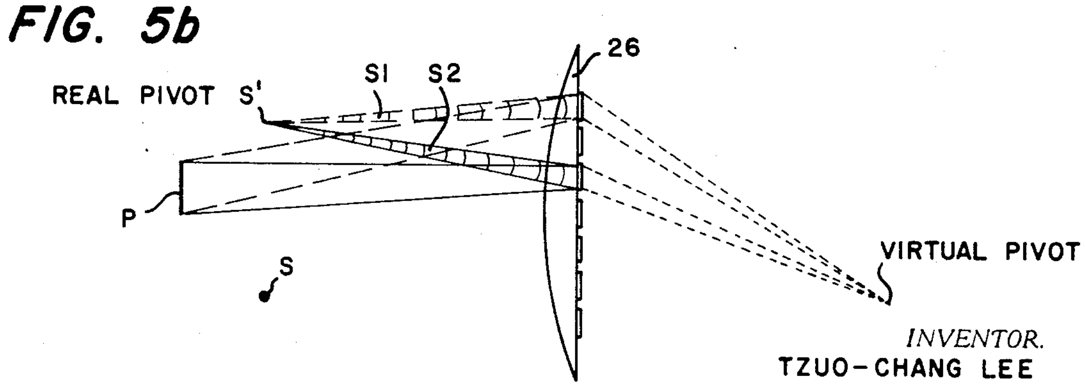

FIG. 5 describes the effect of the use of pivoting lens 24 in a Kerr readout system. FIG. 5*a* shows that the virtual images produced from different holograms and indicates that the images possess a virtual pivot which is a mirror image of the original object S. If pivoting lens 26 is placed in front of memory medium 12, as shown in FIG. 5*b*, pivoting lens 26 does not affect the construction of the holograms, but the reconstructed Kerr images have a real pivot denoted as S′.

It should be noted that in FIG. 4, page composer 20 and detector array 25 obey an object-image relationship with respect to field lens 26. It can be shown that when page composer 20 and detector array 25 are positioned symmetrically with respect to the principal axis of pivoting lens 26, and when the magnification of pivoting lens 26 is unity, the astigmatism and distortion of these elements is automatically eliminated.

Figure 6A:
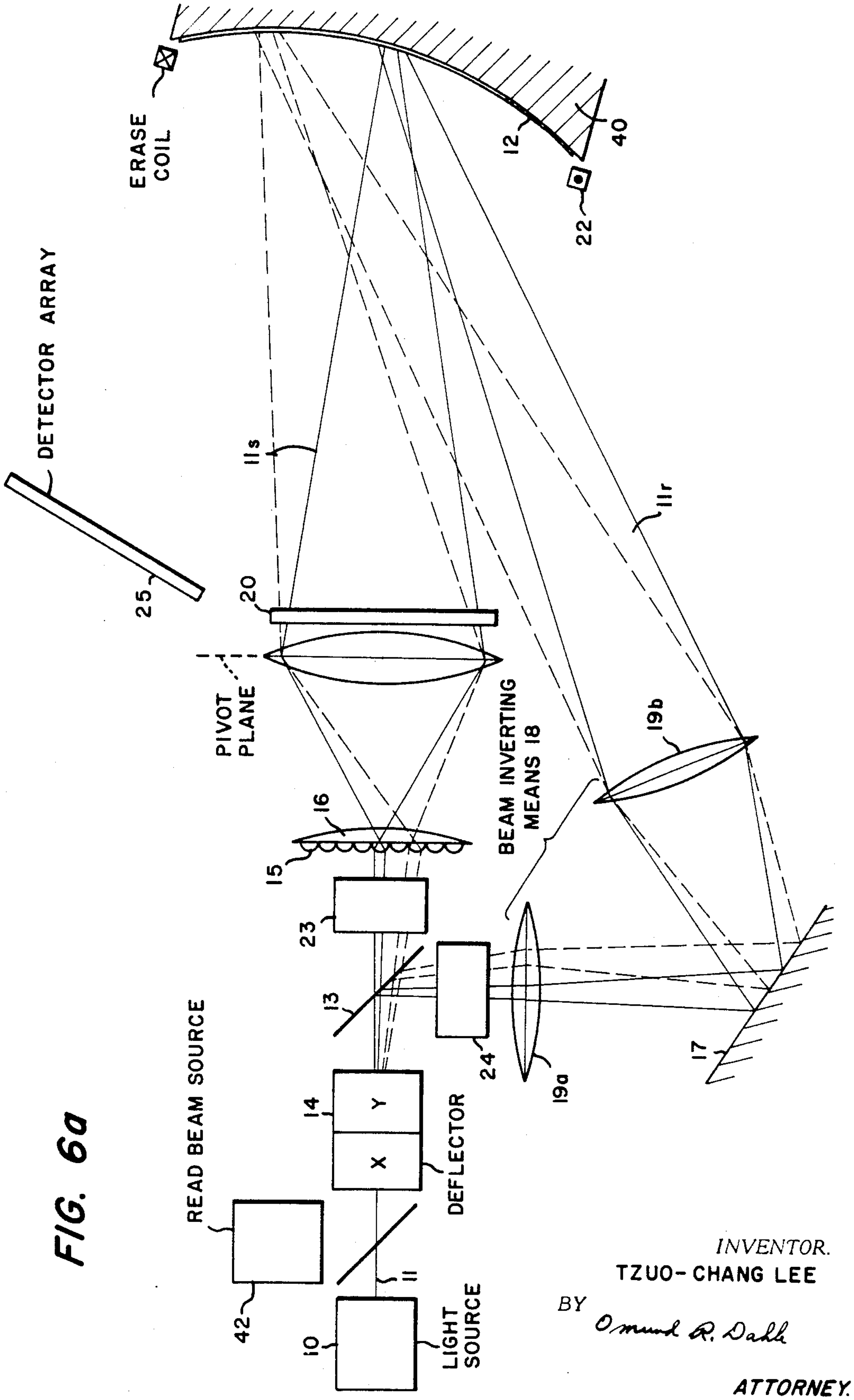
FIGS. 6*a* and 6*b* show another embodiment of the present invention in which the pivoting means comprises a mirror.
Figure 6B:
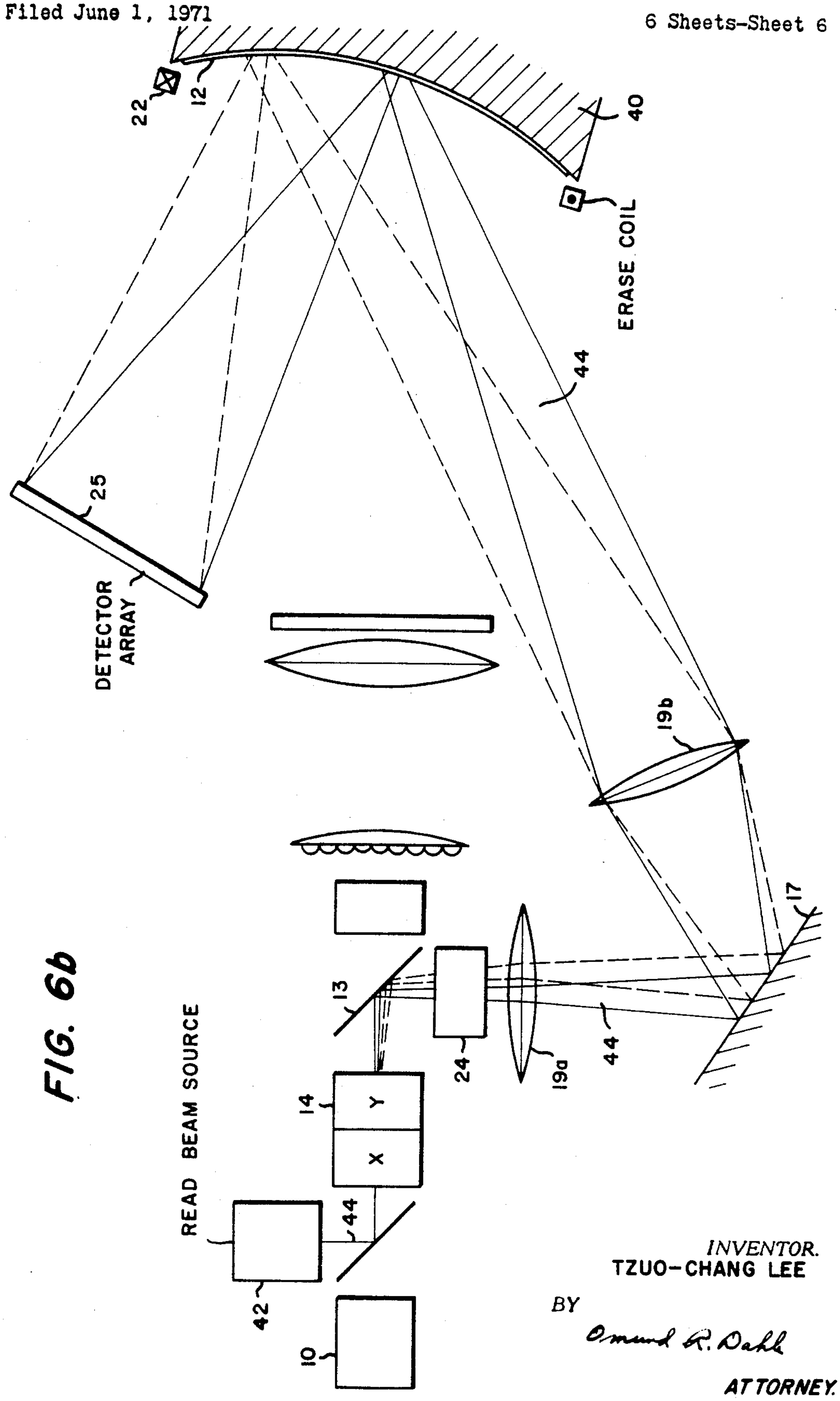

Another embodiment of the present invention which utilizes the Kerr effect readout is shown in FIGS. 6*a* and 6*b*. The system of FIG. 6 is similar to that shown in FIG. 4 and similar numerals are used to designate similar elements. In the embodiment shown, the pivoting means comprises a parabolic mirror 40. Memory medium 12 comprises a magnetic film such as MnBi which is deposited on the surface of parabolic mirror 40. It should also be noted that beam inverting means 18 and mirror 17 are positioned in the path of first beam 11*r*, rather than in the path of second beam 11*s* as shown in FIGS. 1 and 4.

In certain applications, it is desirable to utilize a readout beam which is different from first beam 11*r* used during the writing stage of operation. For example, it may be desirable to use a readout beam having a different optical wavelength than that of first beam 11*r*. FIG. 6*b* illustrates the use of a readout beam which is different from first beam 11*r*. Readout beam source means 42 provide a beam 44 of intensity insufficient to alter the hologram stored in memory medium 12 during the reading stage. Readout beam directing means direct readout beam 44 to a selected region of memory medium 12 during the reading stage. As shown in FIG. 6*b*, readout beam directing means are identical to the beam directing means which direct first beam 11*r* to selected regions of memory medium 12 during the writing stage of operation. However, it is to be understood that readout beam directing means may include apparatus different from that utilized in directing first beam 11*r*. During readout, a portion of readout beam 44 is diffracted by the hologram to form a reconstructed image of the bit pattern stored in the hologram. Parabolic mirror 40 pivots the diffracted portion of readout beam 44 from each of the plurality of halograms stored in memory medium 12 to the common reconstructed image plane.

While this invention has been disclosed with particular reference to the preferred embodiments, it will be understood by those skilled in the art that changes in form and details may be made without departing from the spirit and scope of the invention.

The embodiments of the invention in which an exclusive property or right is claimed are defined as follows:

1. A holographic optical memory comprising:

light source means for providing a coherent light beam, beam splitter means for splitting the coherent light beam into a first and a second beam, a memory medium for the storage of a plurality of holograms in different regions of the memory medium, beam directing means for simultaneously directing the first and second beams to coincide at a selected region of the memory medium during the writing stage, page composer means positioned in the path of the second beam between the beam splitter means and the memory medium for creating a bit pattern in the second beam during the writing stage, beam intensity control means for causing the combined intensity of the first and second beams to be sufficient to store the bit pattern as a hologram during the writing stage, readout beam source means for providing a coherent readout beam of intensity insufficient to alter the hologram during the reading stage.

readout beam directing means for directing a readout beam to a selected region of the memory medium during the reading stage, wherein a portion of the readout beam is diffracted by the hologram to form a reconstructed image of the bit pattern stored in the halogram, pivoting means positioned proximate the memory medium for pivoting the diffracted portion of the readout beam from any one of the plurality of holograms into a common reconstructed image plane, and an array of detectors positioned at the common reconstructed image plane, each detector positioned to receive the light representing one bit of the bit pattern and to provide an output signal indicative of the intensity of the light received.

2. The halographic optical memory of claim 1 wherein the beam directing means comprises:

light beam deflector means positioned between the light source means and the beam splitter means for deflecting the first and second beams to a plurality of resolvable spots, mirror means positioned in the path of one of the first and second beams for changing the direction of propagation of the beam, inverting means positioned in the path of one of the first and second beams for inverting the angular direction of the beam, an array of individual lenses positioned in the path of the second beam, each lens being positioned at one of the plurality of resolvable spots, for reducing the beam diameter of the resolvable spots, and field lens means positioned in the path of the second beam between the array of individual lenses and the page composer means for pivoting the second beam at a first pivot plane.

3. The holographic optical memory of claim 2 wherein beam inverting means comprises first and second lenses.

4. The holographic optical memory of claim 2 wherein the page composer means is positioned essentially at the first pivot plane.

5. The holographic optical memory of claim 2 wherein the beam inverting means is positioned in the path of the second beam.

6. The holographic optical memory of claim 5 wherein the beam inverting means is positioned essentially at the first pivot plane wherein the beam inverting means further pivots the second beam at a second pivot plane.

7. The holographic optical memory of claim 6 wherein the page composer means is positioned proximate the second pivot plane.

8. The holographic optical memory of claim 1 wherein during the reading stage, the first beam is the readout beam.

9. The holographic optical memory of claim 1 and further comprising Fourier transform lens means positioned in the path of the second beam proximate the page composer means for performing a Fourier transform of the bit pattern produced by the page composer means.

10. The holographic optical memory of claim 1 and wherein the pivoting means comprises pivoting lens means.

11. The holographic optical memory of claim 10 wherein the pivoting lens means comprises a lens having a substantially flat surface and a curved surface.

12. The holographic optical memory of claim 11 wherein the memory medium comprises a deposited layer on the substantially flat surface.

13. The holographic optical memory of claim 1 wherein the memory medium is a magnetic film.

14. The holographic optical memory of claim 13 wherein the diffracted portion of the readout beam is transmitted through the magnetic film.

15. The holographic optical memory of claim 13 wherein the diffracted portion of the readout beam is reflected by the magnetic film.

16. The holographic optical memory of claim 13 wherein the magnetic film is manganese bismuth.

References Cited

UNITED STATES PATENTS

| | | | |
|---|---|---|---|
| 3,604,777 | 9/1971 | Mathisen | 350—3.5 |
| 3,612,641 | 10/1971 | Eaglesfield | 340—173 LT |
| 3,614,189 | 10/1971 | Stewart | 340—174 LM |
| 3,460,099 | 8/1969 | Fredkin | 340—174 LM |
| 3,600,054 | 8/1971 | Gabor | 350—3.5 |
| 3,598,484 | 8/1971 | Redman | 350—3.5 |
| 3,600,056 | 8/1971 | King, Jr. | 350—3.5 |
| 3,560,070 | 2/1971 | Pennington et al. | 350—3.5 |
| 3,622,988 | 11/1971 | Caulfield et al. | 340—146.3 P |
| 3,640,599 | 2/1972 | Van Ligten | 350—3.5 |

STANLEY M. URYNOWICZ, JR., Primary Examiner

U.S. Cl. C.X.

350—3.5; 340—173 LM